United States Patent [19]

Kushibe

[11] 3,933,982
[45] Jan. 20, 1976

[54] METHOD OF STABILIZING ACID AQUEOUS SOLUTIONS OF HYDROGEN PEROXIDE

[75] Inventor: Kazuyoshi Kushibe, Fuji, Japan

[73] Assignee: Tokai Denka Kogyo Kabushiki Kaisha, Tokyo, Japan

[22] Filed: Nov. 26, 1973

[21] Appl. No.: 419,028

[30] Foreign Application Priority Data
Feb. 21, 1973 Japan.............................. 48-20194

[52] U.S. Cl................................. 423/272; 423/272
[51] Int. Cl.².......................................... C01B 15/02
[58] Field of Search..................... 423/272; 252/399

[56] References Cited
UNITED STATES PATENTS

| | | | |
|---|---|---|---|
| 1,002,854 | 9/1911 | Liebknecht......................... | 423/272 |
| 3,037,847 | 6/1962 | Warshaw ............................ | 423/272 |
| 3,394,993 | 7/1968 | Grifo.................................... | 423/272 |
| 3,801,512 | 4/1974 | Solenberger...................... | 423/272 X |

FOREIGN PATENTS OR APPLICATIONS
1,157,038      1969    United Kingdom................. 423/272

Primary Examiner—Oscar R. Vertiz
Assistant Examiner—Wayne A. Langel

[57] ABSTRACT

This invention provides an improved method for stabilizing hydrogen peroxide in an acid aqueous solution of hydrogen peroxide containing copper ion capable of catalytically decomposing hydrogen peroxide. According to this invention there is used as a stabilizer in such method at least one glycol ether represented by the general formula $R(OCH_2CH_2)_n$—OH wherein R is an alkyl group containing 1 to 4 carbon atoms and n is an integer from 1 to 2, and this stabilizer is added in the foregoing aqueous solution preferably in an amount of at least 0.1 g/l.

11 Claims, No Drawings

METHOD OF STABILIZING ACID AQUEOUS SOLUTIONS OF HYDROGEN PEROXIDE

BACKGROUND OF THE INVENTION

1. Field of the Invention

This invention relates to a method of stabilizing acid aqueous solutions of hydrogen peroxide which are used in chemically solubilizing treatments such as pickling, etching and chemical polishing of copper and copper alloys. More particularly, it is an object of this invention to add glycol ethers to acid aqueous solutions of hydrogen peroxide which are unstable in the presence of copper ions to inhibit decomposition of the hydrogen peroxide for achievement of its economical use.

2. Description of the Prior Art

Chemcially dissolving treatments such as pickling which is removal by dissolving of oxidation scales on the surface of metallic materials, etching which is removal by dissolving of a portion of metallic phase and chemical polishing which is a polish treatment of the surface, are utilized in a wide area of industrial fields involving metallic materials.

Acid aqueous solutions of hydrogen peroxide are known to possess high solubilizing powers as chemically solubilizing agents for copper and copper alloy materials. On the other hand, hydrogen peroxide is a readily decomposable compound which is catalytically decomposed especially in the presence of copper ion. Consequently, it is economically disadvantageous that when an acid aqueous solution of hydrogen peroxide is employed in a chemically solubilizing treatment of copper and copper alloys, the copper is dissolved and accumulated in the solution to accelerate decomposition of the hydrogen peroxide, thereby considerably lowering the ratio of effective utilization of hydrogen peroxide.

Typical solutions among the acid aqueous solution for use in the chemically solubilizing treatment of copper and copper alloys contain 10–150 g./l. of hydrogen peroxide and 10–200 g./l. of sulfuric acid. These solutions have been critically defective in practical uses in that, whereas they are stable in the absence of copper ion therein, the hydrogen peroxide will be rapidly decomposed or disappear in the presence of copper ions accumulated in the solutions.

Improvements heretofore known for reducing the decomposition of hydrogen peroxide include adding as a stabilizer saturated aliphatic alcohols, phenols, proteins, polymethylene polyamines and the like to the said aqueous solution of hydrogen peroxide. But, stabilizers having better stabilizing property have been desired.

SUMMARY OF THE INVENTION

We have found that glycol ethers have extremely excellent effects for stabilizing hydrogen peroxide in an acid aqueous solution of hydrogen peroxide and are very advantageous stabilizers of practical use.

This invention, on the basis of this finding, provides a stabilizing method superior to any of the heretofore known methods of stabilization.

DESCRIPTION OF THE INVENTION

According to the invention, the decomposition reaction of hydrogen peroxide with copper ion is inhibited by the addition of one or more glycol ethers to an acid aqueous solution of hydrogen peroxide typically containing a mineral acid such as sulfuric acid to enable practical use of the chemically solubilizing treatment of copper and copper alloys.

In addition to the case for sulfuric acid, the present invention is useful for acid aqueous solutions of hydrogen peroxide containing another mineral acid such as nitric or phosphoric acid.

The glycol ethers used in the invention are represented by the general formula $$R(OCH_2CH_2)_n-OH$$ 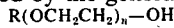

wherein R is alkyl containing 1–4 carbon atoms and n is an integer from 1 to 2, which are compounds containing in the molecule both ether group and OH group. Examples are ethyleneglycol monomethylether, ethyleneglycol monoethylether, ethyleneglycol monobutylether, diethyleneglycol monomethylether, diethyleneglycol monoethylether and diethyleneglycol monobutylether.

Although these glycol ethers are more or less effective even at a concentration as low as 0.1 g./l. or lower, expected outstanding effects cannot be obtained at such a concentration. The expected effects are obtained at a concentration higher than 0.1 g./l. and increase in the added amount leads to increase in the effect, which is approximately constant at 5 g./l. The addition of more than 5 g./l. would be meaningless and uneconomical.

DESCRIPTION OF THE PREFERRED EMBODIMENTS

EXAMPLE 1

To an aqueous solution containing 75 g./l. of $H_2O_2$, 100 g./l. of $H_2SO_4$ and 50 g./l. of $CuSo_4-5H_2O$ at 50°C was added a glycol ether. Decomposed amounts of hydrogen peroxide were measured to give the results shown in the table below.

| Additive according to the invention | Added amount (g./l.) | Decomposed amount of hydrogen peroxide (mg.—$H_2O_2$/l. min.) |
|---|---|---|
| No additive | 0 | 195 |
| Ethyleneglycol monomethylether | 0.1 | 54 |
| '' | 0.5 | 13 |
| '' | 1 | 5 |
| '' | 5 | 1.8 |
| '' | 10 | 1.5 |
| Ethyleneglycol monoethylether | 5 | 2.0 |
| Ethyleneglycol monobutylether | 10 | 1.6 |
| Diethyleneglycol monomethylether | 10 | 1.3 |
| Diethyleneglycol monoethylether | 5 | 1.9 |
| Diethyleneglycol monobutylether | 20 | 1.4 |

EXAMPLE 2

Decomposed amount of the hydrogen peroxide in an aqueous solution containing 50 g./l. of $H_2O_2$, 30 g./l. of $HNO_3$, 50 g./l. of $CuSo_4$—$5H_2O$ and 5 g./l. of ethyleneglycol monomethylether at 30°C was 3 mg./l.min. Decomposed amount of the hydrogen peroxide in the absence of ethyleneglycol monomethylether added under the same conditions was 254 mg./l.min. It follows that the decomposed amount $H_2O_2$ was about 1/85 as much as the case without the addition.

EXAMPLE 3

Decomposed amount of hydrogen peroxide in an aqueous solution containing 100 g./l. of $H_2O_2$, 50 g./l. of $H_3PO_4$, 100 g./l. of $CuSO_4$—$5H_2O$ and 5 g./l. of ethyleneglycol monobutylether at 60°C. was 2 mg./l.min. Decomposed amount of the hydrogen peroxide in the absence of ethyleneglycol monobutylether added under the same conditions was 221 mg./l.min. It follows that the decomposed amount of $H_2O_2$ was about 1/110 as much as the case without the addition.

I claim:

1. In the method of stabilizing hydrogen peroxide in an acid aqueous solution of hydrogen peroxide containing copper ion capable of catalytically decomposing hydrogen peroxide by incorporating a stabilizer to said aqueous solution, the improvement which comprises using as the stabilizer at least one glycol ether represented by the general formula $R(OCH_2CH_2)_n-OH$ wherein R is an alkyl group containing 1 to 4 carbon atoms and n is an integer from 1 to 2.

2. Method according to claim 1 wherein said glycol ether is in said aqueous solution in an amount not less than 0.1 g./l.

3. Method according to claim 1 wherein said glycol ether is in said aqueous solution in an amount of from 0.1 g./l. to 5g./l.

4. Method according to claim 1 wherein said glycol ether is selected from the group consisting of ethyleneglycol monomethylether, ethyleneglycol monoethylether, ethyleneglycol monobutylether, diethyleneglycol monomethylether, diethyleneglycol monoethylether, and diethyleneglycol monobutylether.

5. Method according to claim 1, wherein said glycol ether is ethyleneglycol monomethylether.

6. Method according to claim 1, wherein said glycol ether is ethyleneglycol monoethylether.

7. Method according to claim 1, wherein said glycol ether is ethyleneglycol monobutylether.

8. Method according to claim 1, wherein said glycol ether is diethyleneglycol monomethylether.

9. Method according to claim 1, wherein said glycol ether is diethyleneglycol monoethylether.

10. Method according to claim 1, wherein said glycol ether is diethyleneglycol monobutylether.

11. Method according to claim 1, wherein the acid of said solution is selected from the group consisting of sulfuric acid, nitric acid, and phosphoric acid.

* * * * *